Nov. 18, 1958       J. E. JONES         2,860,983
PHOTOGRAPHIC EMULSIONS CONTAINING POLYMETHINE
DYES AND KETONE COMPOUNDS
Filed May 21, 1956

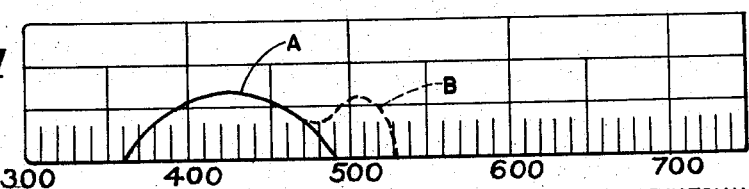

Fig. 1

A = 2-(3,3-DICYANO-2-METHYLALLYLIDENE)-1-ETHYL-β-NAPHTHOTHIAZOLINE
B = 2-(3,3-DICYANO-2-METHYLALLYLIDENE)-1-ETHYL-β-NAPHTHOTHIAZOLINE
    WITH p-DIMETHYLAMINOCINNAMALACETOPHENONE

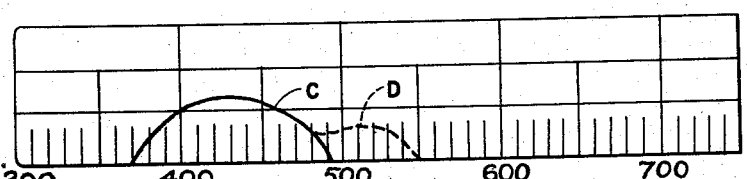

Fig. 2

C = 2-(3,3-DICYANO-2-PHENYLALLYLIDENE)-1-METHYL-β-NAPHTHOTHIAZOLINE
D = 2-(3,3-DICYANO-2-PHENYLALLYLIDENE)-1-METHYL-β-NAPHTHOTHIAZOLINE
    WITH p-DIMETHYLAMINOCINNAMALACETOPHENONE

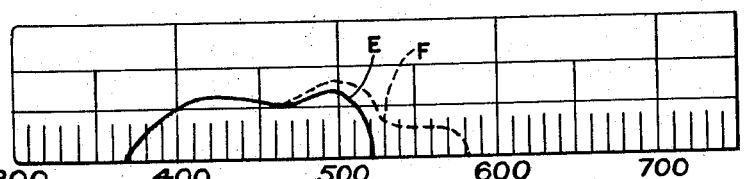

Fig. 3

E = 2-(3,3-DICYANO-2-ETHYLALLYLIDENE)-2-METHYLBENZOTHIAZOLINE
F = 2-(3,3-DICYANO-2-ETHYLALLYLIDENE)-2-METHYLBENZOTHIAZOLINE
    WITH p-DIMETHYLAMINOCINNAMALACETOPHENONE

Jean E. Jones
INVENTOR.

BY
ATTORNEYS

United States Patent Office 2,860,983
Patented Nov. 18, 1958

1

2,860,983

PHOTOGRAPHIC EMULSIONS CONTAINING POLYMETHINE DYES AND KETONE COMPOUNDS

Jean E. Jones, Rochester, N. Y., assignor to Eastman Kodak Company, Rochester, N. Y., a corporation of New Jersey Application May 21, 1956, Serial No. 586,055

18 Claims. (Cl. 96—104)

The instant invention relates to photographic emulsions containing polymethine dyes, and as supersensitizers therefor, certain ketone compounds.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found a new means of altering the sensitivity in emulsions containing cyanine dyes. Since the conditions in the emulsion, i. e., the hydrogen ion and/or the silver ion concentration undergo little or no change in my method, I shall designate my new method as a kind of supersensitization.

It is, therefore, an object of my invention to provide photographic emulsions containing certain polymethine dyes and, as supersensitizers therefor, certain ketone compounds. Another object is to provide a process for preparing these sensitized emulsions. Other objects will become apparent from a consideration of the following description and examples.

The polymethine dyes useful in practicing my invention include those represented by the following two general formulas:

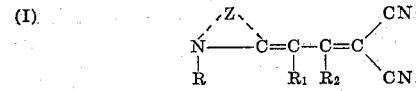

and

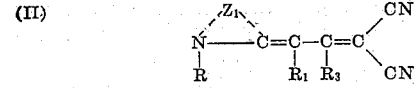

wherein R represents a lower alkyl group, such as methyl, ethyl, etc., $R_1$ represents a hydrogen atom or a co-valent bond, $R_2$ represents a lower alkyl group, such as methyl, ethyl, etc., a lower alkoxyl group, such as methoxyl, ethoxyl, etc., a monocyclic aryl group, such as phenyl, tolyl, etc., a heterocyclic group, such as thienyl, etc., or a trimethylene group when $R_1$ represents a covalent bond (i. e., $R_1$ and $R_2$ together represent the atoms necessary to complete a cyclopentane ring), $R_3$ represents a hydrogen atom, a lower alkyl group, such as methyl, ethyl, etc., a monocyclic aryl group, such as phenyl, tolyl, etc., a heterocyclic group, such as thienyl, etc., or a trimethylene group when $R_1$ represents a covalent bond (i. e., $R_1$ and $R_3$ together represent the atoms necessary to complete a cyclopentane ring), Z represents the non-metallic atoms necessary to complete a heterocyclic nucleus of the benzothiazole series or the naphthothiazole series, and $Z_1$ represents the non-metallic atoms necessary to complete a heterocyclic nucleus of the benzoxazole series, provided that when Z represents the non-metallic atoms necessary to complete a heterocyclic nucleus of the benzothiazole series, R represents a methyl group. The heterocyclic nuclei represented by Z and $Z_1$ can have substituents, such as chlorine, bromine, methyl, phenyl, hydroxyl, methoxyl, etc., attached to the benzene rings thereof.

The ketone compounds useful in practicing my invention can advantageously be represented by the following two general formulas:

(III) 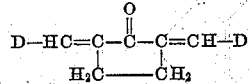

and (IV) 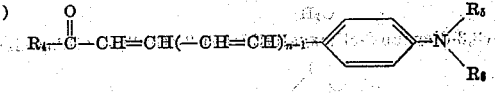

wherein D represents a dialkylaminoaryl group (e. g., dimethylaminophenyl, diethylaminophenyl, etc.) or a pyrryl group (e. g., 1-aryl-2,5-dimethyl-3-pyrryl, wherein the aryl group is a monocyclic aryl group, such as phenyl, tolyl, etc.), $R_4$ represents an aryl group (e. g., phenyl, tolyl, naphthyl, etc., especially an aryl group containing from 6 to 10 carbon atoms), a dialkylaminoarylvinyl group (e. g., dimethylaminophenylvinyl, diethylaminophenylvinyl, etc.) or a dialkylaminoaryl-1,3-butadienyl group (e. g., dimethylaminophenyl-1,3-butadienyl, diethylaminophenyl-1,3-butadienyl, etc.), $R_5$ and $R_6$ each represents a lower alkyl group, such as methyl, ethyl, etc., and n represents a positive integer of from 1 to 2.

Polymethine dyes, e. g., those selected from those represented by Formulas I and II above, which can advantageously be employed in my invention comprise the dyes represented by the following formulas:

(1) 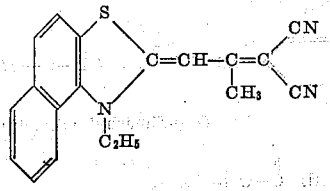

2-(3,3-dicyano-2-methylallylidene)-1-ethyl-β-naphthothiazoline (2) 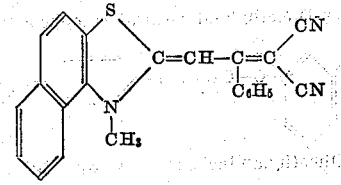

2-(3,3-dicyano-2-phenylallylidene)-1-methyl-β-naphthothiazoline (3) 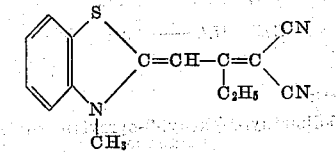

2-(3,3-dicyano-2-ethylallylidene)-3-methylbenzothiazoline (4)
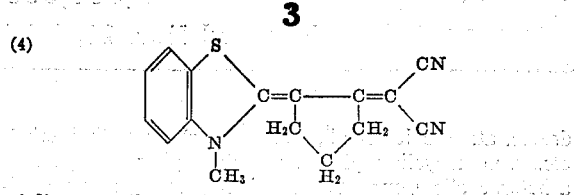
1-dicyanomethylene-2-(3-methyl-2(3H)-benzothiazolylidene)-cyclopentane (5)
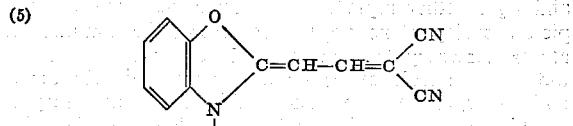
2-(3,3-dicyanoallylidene)-3-ethylbenzoxazoline (6)
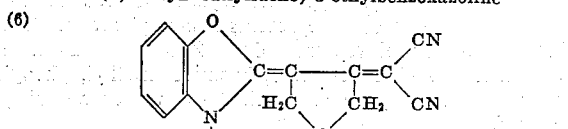
1-dicyanomethylene-2-(3-methyl-2(3H)-benzoxazolylidene)-cyclopentane (7)
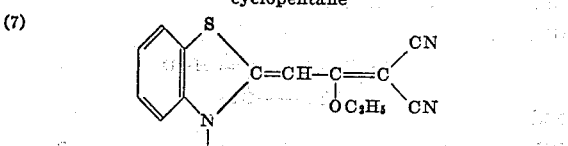
2-(3,3-dicyano-2-ethoxyallylidene)-3-ethylbenzothiazoline (8)
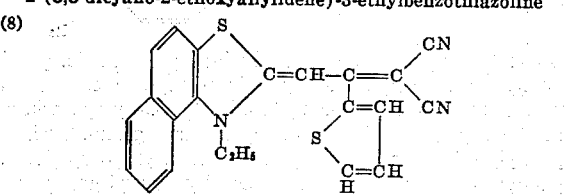
2-[3,3-dicyano-2-(2-thienyl)allylidene]-1-ethyl-β-naphthothiazoline Ketone compounds represented by Formulas III and IV above which can advantageously be employed in my invention comprise the ketone compounds represented by the following formulas:

(A)
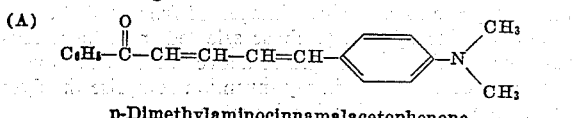
p-Dimethylaminocinnamalacetophenone (B)
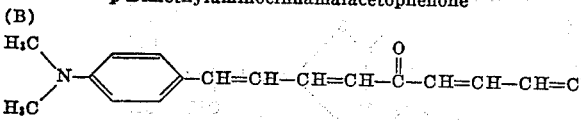
Di-p-dimethylaminocinnamalacetone (C)
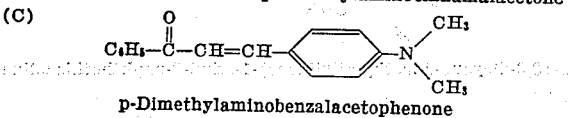
p-Dimethylaminobenzalacetophenone (D)
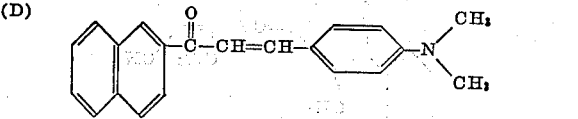
p-Dimethylaminobenzal-2-acetonaphthalene (E)
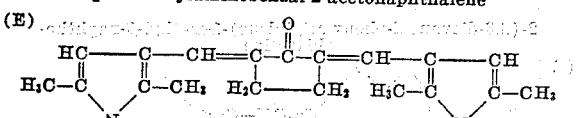
2,5-di[(2,5-dimethyl-1-phenyl-3-pyrryl)methylene]cyclopentanone (F)
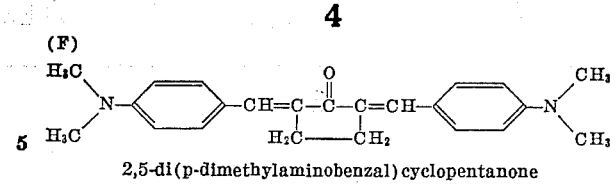
2,5-di(p-dimethylaminobenzal)cyclopentanone According to my invention, I incorporate one or more of the polymethine dyes selected from those represented by Formulas I or II above with one or more of the ketone compounds selected from those represented by Formulas III or IV above in a photographic emulsion. My invention is particularly directed to the ordinarily employed gelatino-silver-halide emulsions. However, my supersensitizing combinations can be employed in silver halide emulsions in which the carrier is other than gelatin, e. g., a resinous substance or cellulosic material which has no deteriorating effect on the silver-halides.

My invention is primarily directed to the ordinarily employed gelatino-silver-halide developing-out emulsions, e. g., gelatino-silver-chloride, -chlorobromide, -chloroiodide, -chlorobromiodide, -bromide and -bromiodide developing-out emulsions. While the results in Table A were obtained using gelatino-silver-bromiodide emulsions, useful results have also been obtained using gelatino-silver-chlorobromide emulsions. Particularly improved sensitizing activity has been obtained in gelatino-silver-bromiodide emulsions of the developing-out type. Emulsions which form the latent image mostly inside the silver halide grains, such as the emulsions set forth in U. S. Patent 2,456,956, dated December 21, 1948, can also be employed in practicing my invention.

The emulsions prepared in accordance with my invention can be coated in the usual manner on any suitable support, e. g., glass, cellulose nitrate film, cellulose acetate film, polyvinyl acetal resin film, glycol terphthalate film, polystyrene film, paper, metal, etc.

The sensitizing dyes and ketone compounds can be employed in various concentrations depending upon the effects desired. As is well known in the art, the sensitivity conferred upon an emulsion by a sensitizing dye does not increase proportionately to the concentration of the dye in the emulsion, but rather passes through an optimum as the concentration is increased. In practicing my invention, the individual sensitizing dyes are advantageously employed at approximately their optimum concentration (i. e., the concentration at which the individual dyes give greatest sensitivity).

The optimum concentration of a sensitizing dye can be determined in a manner well known to those skilled in the art by measuring the sensitivity of a series of test portions of the same emulsion, each portion containing a different concentration of the sensitizing dye. The optimum concentration of my supersensitizing combinations can, of course, be readily determined in the same manner, by measuring the sensitivity of a series of test portions of the same emulsion, each portion containing a different concentration of the sensitizing dye used in the combination. In determining the optimum concentration for the supersensitizing combination, it is advantageous to employ, at first, a concentration of the sensitizing dye somewhat less than its optimum concentration. The concentration of the dye can then be increased until the optimum concentration suitable for use in the combination is determined.

Ordinarily, the optimum or near optimum concentration of the dyes selected from those represented by Formula I or II above which I employ in practicing my invention is of the order of from .05 to .40 gram per mol. of silver halide in the emulsion.

The ketone compounds selected from those represented by Formula III or IV above are advantageously employed in concentrations on the order of from .1 to 2.0 grams per mol. of silver halide in the emulsion.

Generally speaking, the concentration of the dye of Formula I or II to the ketone compound of Formula III or IV can vary rather widely in my combinations, e. g., from 1:2 to 1:40 (by weight) in many cases.

The methods of incorporating sensitizing dyes and ketone compounds in emulsions are well known to those skilled in the art. In practicing my invention, the sensitizing dyes and ketone compounds can be incorporated in the emulsions separately or together. It is convenient to add the dyes and ketone compounds separately in the form of solutions in appropriate solvents. Acetone has proven satisfactory as a solvent for many of the compounds selected from Formulas I–IV which I employ, although pyridine has been found to be satisfactory in certain cases. The dyes and ketone compounds are advantageously incorporated in the finished, washed emulsions and should be uniformly distributed throughout the emulsions. The following procedure is satisfactory: Stock solutions of the sensitizing dyes and ketone compounds described are prepared by dissolving the same in appropriate solvents as described above. Then, to the flowable gelatino-silver-halide emulsion, the desired amounts of the stock solution of one of the dyes or ketone compounds is slowly added, while stirring the emulsion. Stirring is continued until the dye is thoroughly incorporated in the emulsion. Then, the desired amount of the stock solution of the second ingredient (dye or ketone compound) is slowly added to the emulsion, while stirring. Stirring is continued until the second ingredient is thoroughly incorporated. Alternatively, the stock solutions of the dye and ketone compound can be intermixed before addition to the emulsion. Also, instead of using a single dye or ketone compound, a plurality of each can be employed to advantage. The supersensitized emulsion can then be coated out on a suitable support, such as glass, cellulose nitrate film, cellulose acetate film, resin film, paper, etc., to a suitable thickness and allowed to dry. The details of such coating methods are well known to those skilled in the art.

The amounts of sensitizing dye and ketone compound actually incorporated in the emulsion will vary somewhat from case to case, according to the emulsion employed, particular dye and ketone compound employed, and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly my invention is directed to any emulsion containing a combination of the aforesaid sensitizing dyes and ketone compounds, whereby the emulsion has a speed greater than that obtainable with either type of ingredient alone.

The following examples will serve to illustrate further the manner of practicing my invention: To different portions of the same batch of photographic gelatino-silverbromiodide emulsion (Examples 1, 2 and 3) or chlorobromide emulsion (Examples 4 and 5) were added (1) a sensitizing dye selected from those of Formula I or II above and (2) a combination of the sensitizing dye of Formula I or II and a ketone compound selected from those represented by Formula III or IV above. No data on the coating containing the ketone compound of Formula III or IV alone are given in Examples 1 to 3, inasmuch as it has been found that these compounds have no measureable sensitizing action when the emulsions are exposed as described below (i. e., the ketone compounds generally have their maxima in the blue region of the spectrum). While different emulsion batches were employed in some of the examples, the same emulsion batches were employed for the coatings in each individual example. Before coating out the emulsions on the support, the emulsions containing the addenda were digested for a short time in a tank maintained at about 50° C. The different portions of emulsion were then coated on supports and exposed in the usual manner in a spectrograph and a sensitometer (Type Ib) either through a Wratten No. 12 filter, i. e., a filter which transmits substantially no light of wavelength shorter than about 495 mu, or no filter at all. The 30/E speed (minus blue or clear), gamma and fog obtained after development of the exposed emulsions are given below. The developer employed had the following composition:

| | G. |
|---|---|
| p-N-methylaminophenol sulfate | 2.0 |
| Hydroquinone | 8.0 |
| Sodium sulfite (anhydrous) | 90.0 |
| Sodium carbonate monohydrate | 52.5 |
| Potassium bromide | 5.0 |

Water to make one liter.

TABLE A

| Example | | Dye (g./mol. AgX) | Ketone (g./mol. AgX) | 30/E Speed | Gamma | Fog | Exposure |
|---|---|---|---|---|---|---|---|
| 1 | (a) | 1. (.080) | | nil | nil | .05 | Minus Blue. |
|   | (b) | 1. (.080) | A. (.32) | 2.7 | 0.72 | .05 | Do. |
| 2 | (a) | 2. (.080) | | nil | nil | .06 | Do. |
|   | (b) | 2. (.080) | A. (.32) | 5.45 | 1.04 | .06 | Do. |
| 3 | (a) | 3. (.080) | | 1.80 | .32 | .06 | Do. |
|   | (b) | 3. (.080) | A. (.32) | 6.55 | 2.24 | .07 | Do. |
| 4 | (a) | 2. (.24) | | 24.5 | 5.4 | .06 | Clear. |
|   | (b) | 2. (.24) | C. (.6) | 20.5 | 5.5 | .07 | Do. |
|   | (c) | 2. (.24) | C. (.6) | 119 | 4.4 | .06 | Do. |
| 5 | (a) | 2. (.24) | | 24.5 | 5.4 | .06 | Do. |
|   | (b) | 2. (.24) | E. (.6) | 161 | 6.1 | .06 | Do. |
|   | (c) | 2. (.24) | E. (.6) | 235 | 5.7 | .06 | Do. |

The data in the following table were obtained exactly as described above with reference to Table A, except that an ordinary gelatino-silver-chlorobromide emulsion was employed in all cases and exposure was through a Wratten No. 12 filter in all cases. As shown in Table A, a supersensitizing effect is obtained according to my invention when the silver halide emulsions are given a clear exposure, as well as when given a minus blue exposure.

TABLE B

| Example | | Dye (g./mol. AgX) | Ketone (g./mol. AgX) | 30/E Speed | Gamma | Fog |
|---|---|---|---|---|---|---|
| 6 | (a) | 4. (.24) | | .23 | 4.4 | .05 |
|   | (b) | 4. (.24) | A. (.30) | 1.8 | 4.8 | .05 |
| 7 | (a) | 5. (.24) | | nil | nil | .04 |
|   | (b) | 5. (.24) | A. (.30) | 0.3 | 2.76 | .05 |
| 8 | (a) | 6. (.24) | | nil | nil | .04 |
|   | (b) | 6. (.24) | A. (.30) | .17 | 3.26 | .05 |
| 9 | (a) | 8. (.24) | | .25 | 4.4 | .05 |
|   | (b) | 8. (.24) | A. (.30) | .90 | 4.7 | .06 |
| 10 | (a) | 7. (.24) | | nil | nil | .04 |
|   | (b) | 7. (.24) | A. (.30) | .72 | 5.1 | .04 |

In a manner similar to that illustrated in Tables A and B above, other polymethine dyes represented by Formulas I or II above can be employed in combination with the ketone compounds represented by Formulas III or IV above to advantage. I have also found that certain polymethine dyes corresponding to those of Formulas I or II above wherein Z or $Z_1$ represent a heterocyclic nucleus other than benzoxazole, benzothiazole or naphthothiazole can be employed to advantage in certain instances. For example, such dyes wherein Z or $Z_1$ represent the non-metallic atoms necessary to complete a heterocyclic nucleus of the thiazoline series, can be employed in combination with the ketone compounds of Formulas III or IV. However, such combinations are not nearly so useful as the combinations shown in the above tables.

I have also found that simple polymethine dyes corresponding to those of Formulas I or II above can sometimes be employed to advantage in combination with the ketone compounds of Formula III or Formula IV. For example, I have found that 2-dicyanomethylene-3-ethylbenzothiazoline or 2-dicyanomethylene-1-ethyl-1,2-dihydroquinoline, or the like, can be employed to advantage together with the ketone compound of Formulas III or IV, such as compound A above. In general, such combinations are not nearly so useful as those shown in Tables A and B above. Also, compounds corresponding to those of Formulas I or II above, except that one of the cyano groups is replaced by a carbalkoxyl group, can also be employed in combination with the ketone compounds of Formulas III or IV. Such derivatives of the compounds of Formulas I or II are shown in U. S. Patent 2,638,473.

The accompanying drawing illustrates the supersensitizing effect obtained with three of my new combinations of polymethine dyes and ketone compounds in gelatino-silver-bromiodide emulsions. Each figure of the drawing is a diagrammatic reproduction of two spectrograms. In each figure, the sensitivity of the emulsion containing only the polymethine dye of Formulas I or II is represented by the solid curve. The sensitivity of the emulsion containing both the polymethine dye of Formulas I or II and the ketone compounds of Formulas III or IV is represented by the curve consisting of short dashes. No curve showing the sensitivity of the emulsion containing the ketone compounds of Formulas III or IV is shown, since these compounds have no measurable effect on the emulsion employed.

In Figure 1, curve A represents a sensitivity of an ordinary gelatino-silver-bromiodide emulsion sensitized with 2-(3,3-dicyano - 2-methylallylidene)-1-ethyl-β-naphthothiazoline, while curve B represents the sensitivity of the same emulsion sensitized with 2-(3,3-dicyano-2-methylallylidene)-1-ethyl-β-naphthothiazoline and p-dimethylaminocinnamalacetophenone. The sensitometric measurements for these emulsions are given in Example 1 of Table A.

In Figure 2, curve C represents the sensitivity of an ordinary gelatino-silver-bromiodide emulsion sensitized with 2-(3,3-dicyano-2 - phenylallylidene) - 1 - methyl - β-naphthothiazoline, while curve D represents the sensitivity of the same emulsion sensitized with 2-(3,3-dicyano-2-phenylallylidene)-1-methyl-β-naphthothiazoline and p-dimethylaminocinnamalacetophenone. The sensitometric measurements for these emulsions are given in Example 2 of Table A.

In Figure 3, curve E represents the sensitivity of an ordinary gelatino-silver-bromiodide emulsion sensitized with 2 - (3,3-dicyano-2-ethylallylidene) - 3 - methylbenzothiazoline, while curve F represents the sensitivity of the same emulsion sensitized with 2-(3,3-dicyano-2-ethylallylidene)-3-methylbenzothiazoline and p-dimethylaminocinnamalacetophenone. The sensitometric measurements of these emulsions are given in Example 3 of Table A.

Photographic silver halide emulsions, such as those listed above, containing the supersensitizing combinations of my invention can also contain such addenda as chemical sensitizers, e. g., sulfur sensitizers (e. g., allyl thiocarbamide, thiourea, allylisothiocyanate, cystine, etc.), various gold compounds (e. g., potassium chloroaurate, auric trichloride, etc.) (see U. S. Patents 2,540,085, 2,597,856 and 2,597,915), various palladium compounds, such as palladium chloride (U. S. 2,540,086), potassium chloropalladate (U. S. 2,598,079), etc., or mixtures of such sensitizers; anti-foggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," Macmillan Pub., 1942, page 460), or mixtures thereof, hardeners, such as formaldehyde (U. S. 1,763,533), chrome alum (U. S. 1,763,533), glyoxal (U. S. 1,870,354), dicromacrolein (Br. 406,750), etc.; color couplers, such as those described in U. S. Patent 2,423,730, Spence and Carroll U. S. Patent 2,640,776, issued June 2, 1953, etc.; or mixtures of such addenda. Dispersing agents for color couplers, such as those set forth in U. S. Patents 2,322,027 and 2,304,940, can also be employed in the above-described emulsions.

The polymethine dyes represented by Formulas I or II above can be prepared according to known methods. For example, U. S. Patent 2,697,707, issued December 21, 1954, describes the preparation of certain of these dyes. French Patent 1,099,380, delivre March 16, 1955, and corresponding Belgian Patent 519,732, granted May 30, 1952, also describe the preparation of certain of these merocarbocyanine dyes. Belgian Patent 506,549, granted November 14, 1951, describes other dyes embraced by Formulas I or II which can be employed in my invention to advantage.

Many of the ketone compounds represented by Formulas III or IV above are also known substances. For example, British Patent 512,477 and German Patent 810,-458 describe the preparation of these compounds.

The following examples will serve to illustrate further the preparation of certain of the polymethine dyes represented by Formulas I or II and the ketone compounds of Formulas III or IV.

*Example A.—2-(3,3-dicyanoallylidene)-3-ethylbenzoxazoline*

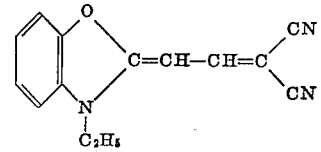

A mixture of 17.36 g. (1 mol.) of 2-β-acetanilidovinyl-3-ethylbenzoxazolium iodide, 13.2 g. (1 mol. plus 400% excess) of malononitrile, 50 ml. of ethyl alcohol and 8.08 g. (1 mol. plus 100% excess) of triethylamine was heated at the refluxing temperature for 10 minutes. After chilling, the solid was collected on a filter and washed with methyl alcohol. The yield of product was 95% crude and 82% after one recrystallization from methyl alcohol. The yellow needles melted, with loss of solvent, at 174–180° C.

*Example B.—2,5-di-[(2,5-dimethyl-1-phenyl-3-pyrryl)-methylene]-cyclopentanone*

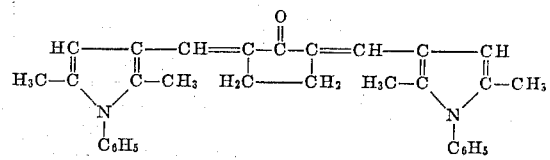

A solution of 1.68 g. (1 mol.) of cyclopentanone and 8.75 g. (1 mol. plus 10% excess) of 2,5-dimethyl-1-phenylpyrrole-3-carboxaldehyde in 20 ml. of ethyl alcohol was heated to the boiling point, a solution of 2.5 g. of 40% sodium hydroxide was added and the reaction mixture was allowed to cool to room temperature. The solid was collected on a filter and washed with methyl alcohol. The yield of product was 76% after two purifications, each of which consisted of dissolving the crystals in hot pyridine, filtering the solution and adding methyl alcohol to the filtrate. The yellow needles had M. P. 274–275° C. with decomposition.

*Example C.—p-dimethylaminobenzal-2-acetonaphthalene*

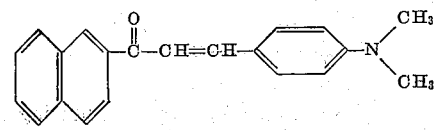

To a solution of 10 g. of p-dimethylaminobenzaldehyde and 11.7 g. of β-acetonaphthone in 200 ml. of ethanol were added 3 ml. of 40% sodium hydroxide solution. The mixture was allowed to stand at room temperature for 15–18 hours. There was a change from yellow to reddish-orange during the first few hours and a solid separated while standing. The solid was collected on a filter, washed with a little ethanol containing a little acetic acid, and dried. The crude product, M. P. 99–104° C., weighed 11.4 g. (56%). Recrystallization from ethanol gave 10.5 g. of pure product melting at 109–110° C.

*Analysis.*—For $C_{12}H_{19}ON$: Calc'd: N, 4.7. Found: N, 4.8.

*Example D.—p-dimethylaminocinnamalacetophenone*

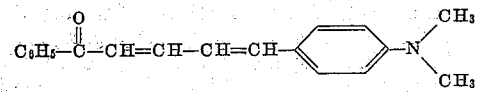

A mixture of 3.5 g. of p-dimethylaminocinnamaldehyde, 2.4 g. of acetophenone, and 40 ml. of alcohol was warmed and 4 ml. of 10% aqueous sodium hydroxide were added. After standing overnight, the product had crystallized in gleaming red plates. The yield of once recrystallized ketone was 3.8 g. (72%), M. P. 151–153° C.

Compound C above was prepared in the same manner as the compound of Example D by replacing the p-dimethylaminocinnamaldehyde used in that example by a molecularly equivalent amount of p-dimethylaminobenzaldehyde.

I have also found that simple, polymethine dyes corresponding to those of Formulas I and II above, i. e., wherein the dicyanomethylene group is directly attached to the basic nuclei, can also be used to supersensitize photographic silver halide emulsions. However, these simple polymethine dyes ordinarily do not give results nearly so useful as the polymethine dyes represented by Formulas I and II. The following example describes the preparation of two simple polymethine dyes which have been used in supersensitizing combinations with the compounds represented by Formulas III or IV above, such as compound A.

*Example E.—2-dicyanomethylene-3-ethylbenzothiazoline*

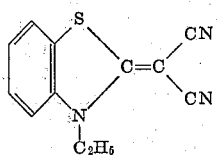

A mixture of 3.49 g. (1 mol.) of 3-ethyl-2-ethylmercaptobenzothiazolium ethylsulfate, 3.3 g. (1 mol. plus 400% excess) of malononitrile, 15 ml. of ethyl alcohol and 1.01 g. (1 mol.) of triethylamine was heated at the refluxing temperature for 10 minutes. After chilling, the solid was collected on a filter and the residue was washed with methyl alcohol. The yield of product was 84% crude and 57% after two recrystallizations from methyl alcohol. The almost colorless crystals had M. P. 197–198° C.

2-dicyanomethylene-1-ethyl-1,2-dihydroquinoline was prepared in like manner by using 4.37 g. (1 mol.) of 1-ethyl-2-phenylmercaptoquinolinium p-toluenesulfonate in place of the 3-ethyl-2-ethylmercaptobenzothiazolium ethylsulfate in the above example. The yield of product was 84% crude and 51% after two recrystallizations from methyl alcohol. The yellow needles had M. P. 195–196° C.

The polymethine dyes of my invention wherein $R_1$ and $R_2$ together represent the atoms necessary to complete a cyclopentane ring can advantageously be prepared according to the method described in U. S. Patent 2,697,707 (corresponds to British 704,770 and 704,840), and as further illustrated in my copending application Serial No. 586,053, filed on even date herewith.

In the following claims, it is to be understood that the $R_7$ group, as used in the formulas, has exactly the same values described in the specification for the $R_1$ group.

What I claim as my invention and desire secured by Letters Patent of the United States is:

1. A photographic silver halide emulsion sensitized with a supersensitizing combination of at least one polymethine dye selected from those represented by the following two general formulas:

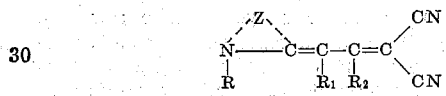

and

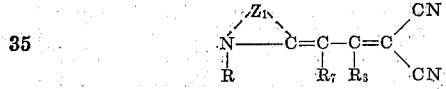

wherein R represents an alkyl group containing from 1 to 2 carbon atoms, $R_1$ represents a member selected from the group consisting of a hydrogen atom and radicals which, together with and bonded to $R_2$, represent the atoms necessary to complete a cyclopentane ring, $R_2$, when $R_1$ is a hydrogen atom, represents a member selected from the group consisting of an alkyl group containing from 1 to 2 carbon atoms, an alkoxyl group containing from 1 to 2 carbon atoms, a monocyclic aryl group of the benzene series, and a thienyl group, $R_7$ represents a member selected from the group consisting of a hydrogen atom and radicals which, together with and bonded to $R_3$, represent the atoms necessary to complete a cyclopentane ring, $R_3$, when $R_7$ represents a hydrogen atom, represents a member selected from the group consisting of a hydrogen atom, an alkyl group containing from 1 to 7 carbon atoms, a monocyclic aryl group of the benzene series and a thienyl group, Z represents the non-metallic atoms necessary to complete a heterocyclic nucleus selected from the group consisting of those of the benzothiazole series and those of the naphthothiazole series, provided that when Z represents the non-metallic atoms necessary to complete a heterocyclic nucleus of the benzothiazole series, R represents a methyl group, and $Z_1$ represents the nonmetallic atoms necessary to complete a heterocyclic nucleus of the benzoxazole series, and at least one ketone compound selected from those represented by the following two general formulas:

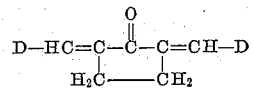

and

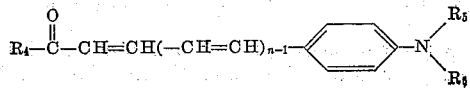

wherein D represents a member selected from the group consisting of a dialkylaminoaryl group wherein the alkyl groups contain from 1 to 2 carbon atoms and a pyrryl group, R₄ represents a member selected from the group consisting of an aryl group, a dialkylaminoarylvinyl group wherein the alkyl groups contain from 1 to 2 carbon atoms and a dialkylaminoaryl-1,3-butadienyl group wherein the alkyl groups contain from 1 to 2 carbon atoms, R₅ and R₆ each represents an alkyl group containing from 1 to 2 carbon atoms, and $n$ represents a positive integer of from 1 to 2.

2. A photographic gelatino-silver-halide developing-out emulsion sensitized with a supersensitizing combination of at least one polymethine dye selected from those represented by the following two general formulas:

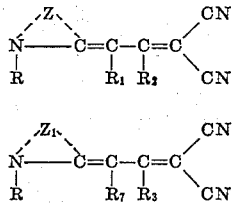

and

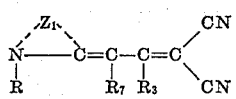

wherein R represents an alkyl group containing from 1 to 2 carbon atoms, R₁ represents a member selected from the group consisting of a hydrogen atom and radicals which, together with and bonded to R₂, represent the atoms necessary to complete a cyclopentane ring, R₂, when R₁ is a hydrogen atom, represents a member selected from the group consisting of an alkyl group containing from 1 to 2 carbon atoms, an alkoxyl group containing from 1 to 2 carbon atoms, a monocyclic aryl group of the benzene series, and a thienyl group, R₇ represents a member selected from the group consisting of a hydrogen atom and radicals which, together with and bonded to R₃, represent the atoms necessary to complete a cyclopentane ring, R₃, when R₇ represents a hydrogen atom, represents a member selected from the group consisting of a hydrogen atom, an alkyl group containing from 1 to 7 carbon atoms, a monocyclic aryl group of the benzene series and a thienyl group, Z represents the non-metallic atoms necessary to complete a heterocyclic nucleus selected from the group consisting of those of the benzothiazole series and those of the naphthothiazole series, provided that when Z represents the non-metallic atoms necessary to complete a heterocyclic nucleus of the benzothiazole series, R represents a methyl group, and Z₁ represents the nonmetallic atoms necessary to complete a heterocyclic nucleus of the benzoxazole series, and at least one ketone compound selected from those represented by the following two general formulas:

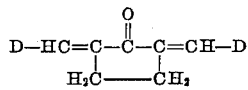

and

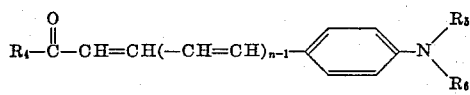

wherein D represents a member selected from the group consisting of a dialkylaminoaryl group wherein the alkyl groups contain from 1 to 2 carbon atoms and a pyrryl group, R₄ represents a member selected from the group consisting of an aryl group, a dialkylaminoarylvinyl group wherein the alkyl groups contain from 1 to 2 carbon atoms and a dialkylaminoaryl-1,3-butadienyl group wherein the alkyl groups contain from 1 to 2 carbon atoms, R₅ and R₆ each represents a lower alkyl group, and $n$ represents a positive integer of from 1 to 2.

3. A photographic silver halide emulsion as defined in claim 2 wherein the silver halide is silver bromiodide.

4. A photographic silver halide emulsion as defined in claim 2 wherein the silver halide is silver chlorobromide.

5. A photographic gelatino-silver-halide developing-out emulsion sensitized with a supersensitizing combination of at least one polymethine dye selected from those represented by the following two general formulas:

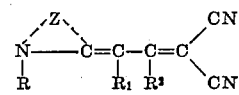

and

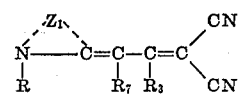

wherein R represents an alkyl group containing from 1 to 2 carbon atoms, R₁ represents a member selected from the group consisting of a hydrogen atom and radicals which, together with and bonded to R₂, represent the atoms necessary to complete a cyclopentane ring, R₂, when R₁ is a hydrogen atom, represents a member selected from the group consisting of an alkyl group containing from 1 to 2 carbon atoms, an alkoxyl group containing from 1 to 2 carbon atoms, a monocyclic aryl group of the benzene series, and a thienyl group, R₇ represents a member selected from the group consisting of a hydrogen atom and radicals which, together with and bonded to R₃, represent the atoms necessary to complete a cyclopentane ring, R₃, when R₇ represents a hydrogen atom, represents a member selected from the group consisting of a hydrogen atom, an alkyl group containing from 1 to 7 carbon atoms, a monocyclic aryl group of the benzene series and a thienyl group, Z represents the non-metallic atoms necessary to complete a heterocyclic nucleus selected from the group consisting of a benzothiazole nucleus and a naphthothiazole nucleus, providing that when Z represents the non-metallic atoms necessary to complete a benzothiazole nucleus, R represents a methyl group and Z₁ represents the non-metallic atoms necessary to complete a heterocyclic nucleus of the benzoxazole series, and at least one ketone compound selected from those represented by the following two general formulas:

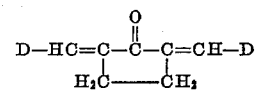

and

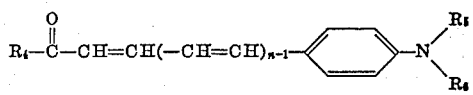

wherein D represents a member selected from the group consisting of a di(lower alkyl)aminoaryl group wherein the lower alkyl groups contain from 1 to 2 carbon atoms and a 1-aryl-2,5-dimethyl-3-pyrrole group wherein the aryl group is a monocyclic aryl group, R₄ represents a member selected from the group consisting of an aryl group containing from 6 to 10 carbon atoms, a di(lower alkyl)aminoarylvinyl group wherein the lower alkyl groups contain from 1 to 2 carbon atoms, and a di(lower alkyl)aminoaryl-1,3-butadienyl group wherein the lower alkyl groups contain from 1 to 2 carbon atoms, R₅ and R₆ each represents a member selected from the group consisting of a methyl group and an ethyl group, and $n$ represents a positive integer of from 1 to 2.

6. A photographic gelatino-silver-halide developing-out emulsion as defined in claim 5 wherein the silver halide is silver bromiodide.

7. A photographic gelatino-silver-halide developing-out emulsion as defined in claim 5 wherein the silver halide is silver chlorobromide.

8. A photographic gelatino-silver-halide developing-out emulsion sensitized with a supersensitizing combination of a dye selected from those represented by the following general formula:

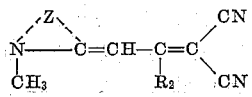

wherein $R_2$ represents a monocyclic aryl group of the benzene series and Z represents the non-metallic atoms necessary to complete a heterocyclic nucleus of the naphthothiazole series, and a ketone compound selected from those represented by the following general formula:

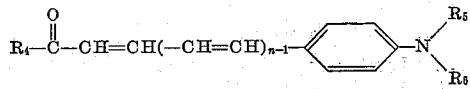

wherein $R_4$ represents a member selected from the group consisting of an aryl group containing from 6 to 10 carbon atoms, a di(lower alkyl)aminoarylvinyl group wherein the lower alkyl groups contain from 1 to 2 carbon atoms, and a di(lower alkyl)aminoaryl-1,3-butadienyl group wherein the lower alkyl groups contain from 1 to 2 carbon atoms, $R_5$ and $R_6$ each represents a member selected from the group consisting of a methyl group and an ethyl group and $n$ represents a positive integer of from 1 to 2.

9. A photographic gelatino-silver-halide developing-out emulsion sensitized with a supersensitizing combination of a dye selected from those represented by the following general formula:

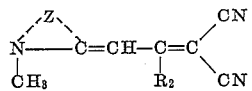

wherein $R_2$ represents a monocyclic aryl group of the benzene series, and Z represents the non-metallic atoms necessary to complete a heterocyclic nucleus of the naphthothiazole series, and a ketone compound selected from those represented by the following general formula:

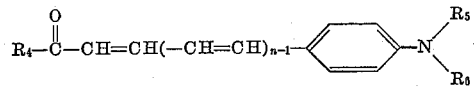

wherein $R_4$ represents an aryl group containing from 6 to 10 carbon atoms, $R_5$ and $R_6$ each represents a member selected from the group consisting of a methyl group and an ethyl group, and $n$ represents a positive integer of from 1 to 2.

10. A photographic gelatino-silver-halide developing-out emulsion sensitized with a supersensitizing combination of 2-(3,3-dicyano-2-phenylallylidene)-1-methyl-β-naphthothiazoline and p-dimethylaminocinnamalacetophenone.

11. A photographic gelatino-silver-halide developing-out emulsion sensitized with a supersensitizing combination of 2-(3,3-dicyano-2-phenylallylidene)-1-methyl-β-naphthothiazoline and p-dimethylaminobenzalacetophenone.

12. A photographic gelatino-silver-halide developing-out emulsion sensitized with a supersensitizing combination of a dye selected from those represented by the following general formula:

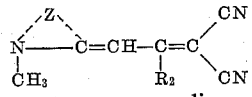

wherein $R_2$ represents a monocyclic aryl group of the benzene series, and Z represents the non-metallic atoms necessary to complete a heterocyclic nucleus of the naphthothiazole series, and a ketone compound selected from those represented by the following general formula:

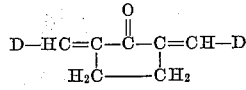

wherein D represents a pyrryl group.

13. A photographic gelatino-silver-halide developing-out emulsion sensitized with a supersensitizing combination of 2-(3,3-dicyano-2-phenylallylidene)-1-methyl-β-naphthothiazoline and 2,5-di[(2,5-dimethyl-1-phenyl-3-pyrryl)methylene]cyclopentanone.

14. A photographic gelatino-silver-halide developing-out emulsion sensitized with a supersensitizing combination of a dye selected from those represented by the following general formula:

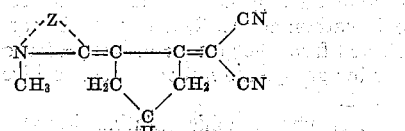

wherein Z represents the non-metallic atoms necessary to complete a heterocyclic nucleus of the benzothiazole series, and a ketone compound selected from those represented by the following general formula:

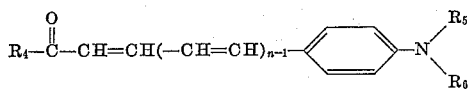

wherein $R_4$ represents a member selected from the group consisting of an aryl group containing from 6 to 10 carbon atoms, a di(lower alkyl)aminoarylvinyl group wherein the lower alkyl groups contain from 1 to 2 carbon atoms, and a di(lower alkyl)aminoaryl-1,3-butadienyl group wherein the lower alkyl groups contain from 1 to 2 carbon atoms, $R_5$ and $R_6$ each represents a member selected from the group consisting of a methyl group and an ethyl group and $n$ represents a positive integer of from 1 to 2.

15. A photographic gelatino-silver-halide developing-out emulsion sensitized with a supersensitizing combination of a dye selected from those represented by the following general formula:

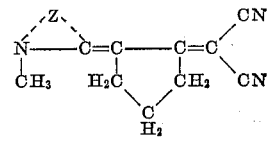

wherein Z represents the non-metallic atoms necessary to complete a heterocyclic nucleus of the benzothiazole series, and a ketone compound selected from those represented by the following general formula:

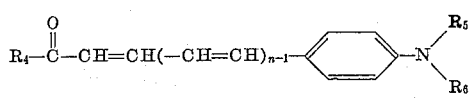

wherein $R_4$ represents an aryl group containing from 6 to 10 carbon atoms, $R_5$ and $R_6$ each represents a member selected from the group consisting of a methyl group and an ethyl group, and $n$ represents a positive integer of from 1 to 2.

16. A photographic gelatino-silver-halide emulsion sensitized with a supersensitizing combination of 1-dicyanomethylene-2-(3-methyl-2(3H)-benzothiazolylidene)cyclopentane and p-dimethylaminocinnamalacetophenone.

17. A photographic gelatino-silver-halide developing-out emulsion sensitized with a supersensitizing combination of a dye selected from those represented by the following general formula:

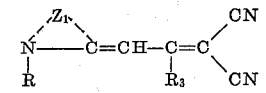

wherein R represents a member selected from the group consisting of a methyl group and an ethyl group, $R_3$ represents a member selected from the group consisting of a hydrogen atom, a methyl group, an ethyl group, a phenyl group and a thienyl group, and $Z_1$ represents the non-metallic atoms necessary to complete a heterocyclic nucleus of the benzoxazole series, and a ketone compound selected from those represented by the following general formula:

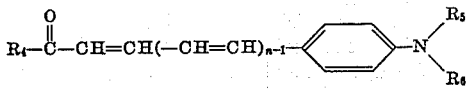

wherein $R_4$ represents an aryl group containing from 6 to 10 carbon atoms, $R_5$ and $R_6$ each represents a member selected from the group consisting of a methyl group and an ethyl group, and $n$ represents a positive integer of from 1 to 2.

18. A photographic gelatino-silver-halide developing-out emulsion sensitized with a supersensitizing combination of 2 - (3,3 - dicyanoallylidene) - 3 - ethylbenzoxazoline and p-dimethylaminocinnamalacetophenone.

References Cited in the file of this patent

UNITED STATES PATENTS

| | | |
|---|---|---|
| 2,638,473 | Edwards | May 12, 1953 |
| 2,697,707 | Kendall et al. | Dec. 21, 1954 |

FOREIGN PATENTS

| | | |
|---|---|---|
| 681,432 | Great Britain | Oct. 22, 1952 |
| 686,733 | Great Britain | Jan. 28, 1953 |

OTHER REFERENCES

Mees: "The Theory of the Photographic Process," revised ed., Macmillan Co., N. Y., 1954, pages 376 and 415.